United States Patent [19]

Sakamoto et al.

[11] Patent Number: 5,530,785
[45] Date of Patent: Jun. 25, 1996

[54] OPTICAL FIBER CABLE FIXING STRUCTURE AND CABLE HOLDER USED FOR FIXING THE CABLE

[75] Inventors: Jun Sakamoto; Takayuki Watanabe, both of Kawasaki, Japan

[73] Assignee: Fujitsu Limited, Kawasaki, Japan

[21] Appl. No.: 322,488

[22] Filed: Oct. 14, 1994

[30] Foreign Application Priority Data

Dec. 28, 1993 [JP] Japan ..................... 5-336442

[51] Int. Cl.⁶ ..................... G02B 6/00
[52] U.S. Cl. ............. 385/136; 385/86; 385/87; 385/100; 385/137
[58] Field of Search ............... 385/81, 86, 87, 385/136, 137, 138, 139, 100

[56] References Cited

U.S. PATENT DOCUMENTS

| | | | |
|---|---|---|---|
| 4,101,198 | 7/1978 | Heldt | 385/87 X |
| 4,705,352 | 11/1987 | Margolin et al. | 385/81 X |
| 4,842,364 | 6/1989 | Chen | 385/136 X |
| 5,185,837 | 2/1993 | Ayuta et al. | 385/81 |
| 5,251,279 | 10/1993 | Shibata et al. | 385/86 |
| 5,367,594 | 11/1994 | Essert et al. | 385/70 |
| 5,425,120 | 6/1995 | Peterson et al. | 385/87 |

*Primary Examiner*—Brian Healy
*Attorney, Agent, or Firm*—Armstrong, Westerman, Hattori, McLeland & Naughton

[57] ABSTRACT

An optical fiber cable fixing structure capable of properly meeting any optical fiber cable having a wide range of diameters without deteriorating optical transmission characteristics when the optical fiber cable is fixed to a fixed-member. The optical fiber cable fixing structure includes an arcuate inner peripheral surface which is to be contacted with a side surface of the optical fiber cable, a first cable holding member secured to the fixed-member, an arcuate inner peripheral surface which is to be contacted with a side surface of the optical fiber cable, a second cable holding member slidably mounted on the fixed-member for sliding toward and away from the first cable holding member, and a stopper for removably securing the second cable holding member at any desired position. A plurality of protuberances each having a sharp tip are provided on the inner peripheral surfaces of the first and second cable holding members, respectively.

11 Claims, 25 Drawing Sheets

FIG.8B
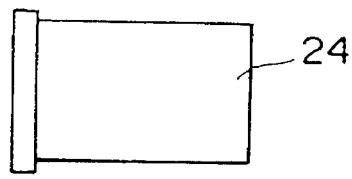
FIG.8D  FIG.8A  FIG.8E
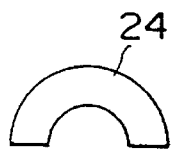 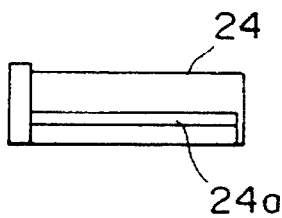 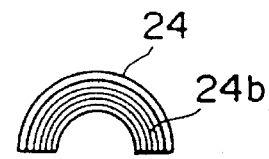
FIG.8C
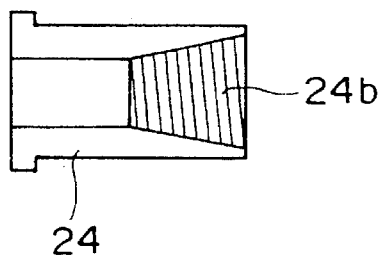

FIG.9B
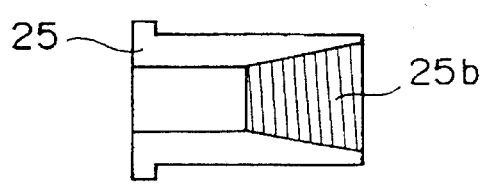
FIG.9D  FIG.9A  FIG.9E
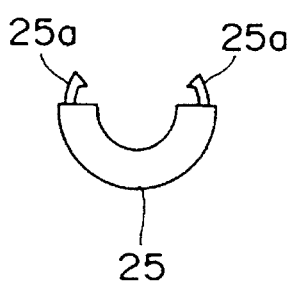 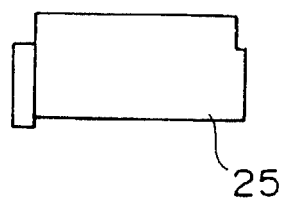 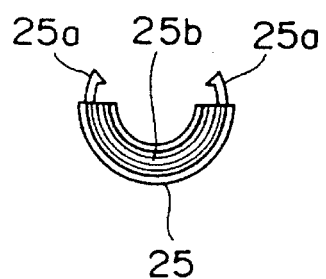
FIG.9C
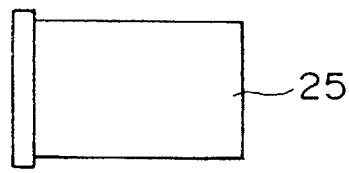

FIG.10B
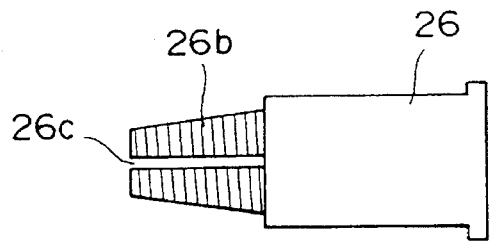
FIG.10D  FIG.10A  FIG.10E
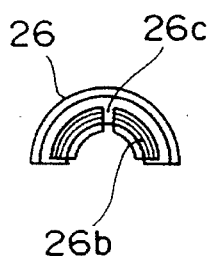 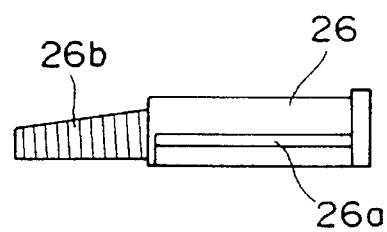 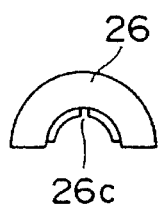
FIG.10C
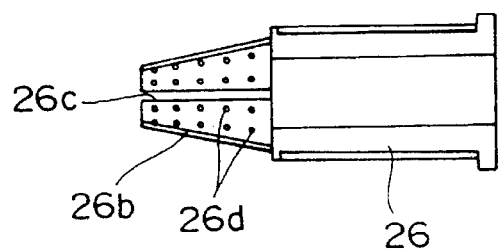

FIG.11B
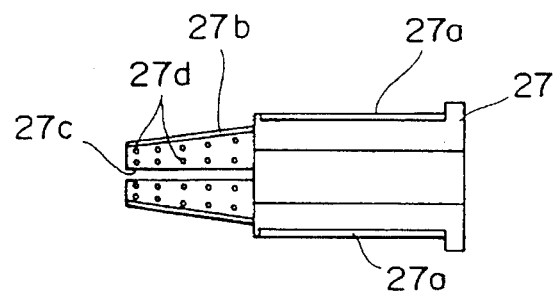
FIG.11D   FIG.11A   FIG.11E
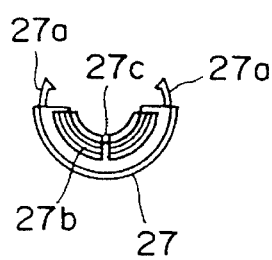 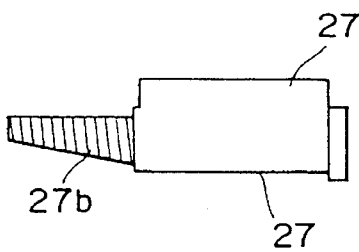 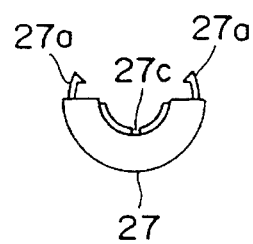
FIG.11C
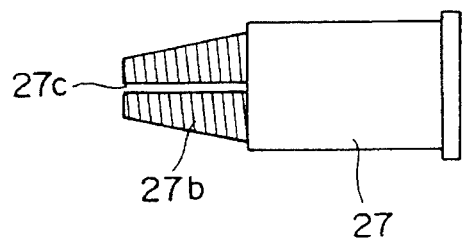

FIG.18B
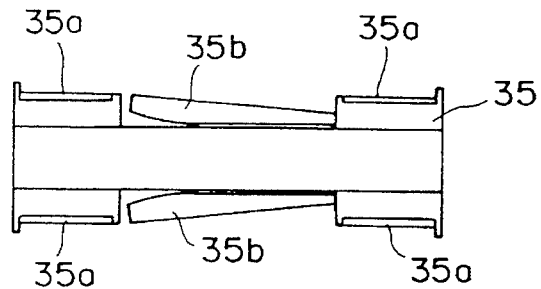
FIG.18D  FIG.18A  FIG.18E
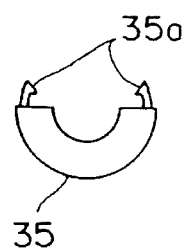 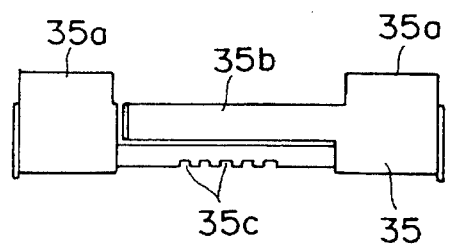 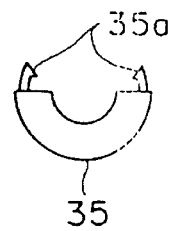
FIG.18C
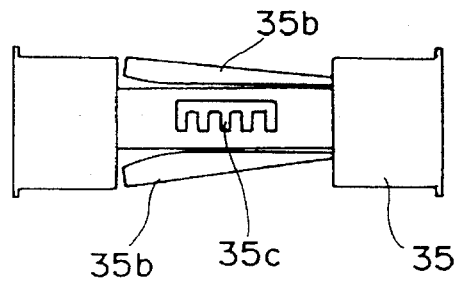

FIG.20B
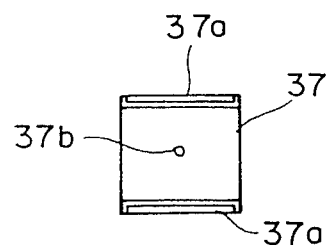
FIG.20D  FIG.20A  FIG.20E
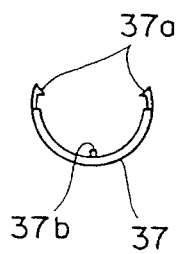 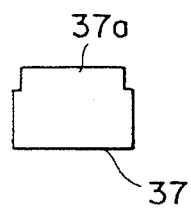 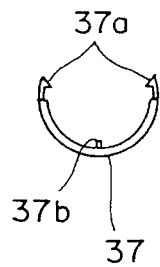
FIG.20C
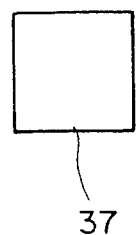

OPTICAL FIBER CABLE FIXING STRUCTURE AND CABLE HOLDER USED FOR FIXING THE CABLE

BACKGROUND OF THE INVENTION

1. Field of the Invention

This invention relates to a structure for fixing an optical fiber cable to a stationary member or fixed-member such as a housing of a light transmitting device, and also to an optical fiber cable fixing holder used for fixing the optical fiber cable.

2. Description of the Related Art

Recently, with the progress of light transmitting technique, a transmission network is developed, in which a communication is performed by light transmitting devices connected to one another by an optical fiber cable. The optical fiber cable is constructed by properly coating a bundle of optical fibers. The opposite ends of the optical fiber cable are fixed to housings of each of the connected light transmitting devices. Those optical fibers, whose coating are removed, are introduced into the housings of the respective light transmitting devices.

FIGS. 27A to 27D, and FIG. 28 are illustrations showing one conventional structure for fixing an optical fiber cable to a fixed-member, such as, a housing of a light transmitting device. As is shown in FIG. 27A, an optical fiber cable 1 comprises a plurality of optical fibers 2, a reinforcing wire 3, a first coating member (press roll) 4 for simply coating the optical fibers 2 and the reinforcing wire 3, and a second coating member (sheath) 5 composed of a vinyl chloride, or the like, for coating all of them.

For fixing the optical fiber cable 1 to the fixed-member, as shown in FIG. 27A, the first and second coating members 4 and 5 are removed from one end of the optical fiber cable 1. Then, as shown in FIG. 27B or 27C, a generally cylindrical reinforcing metal piece 6 is inserted between the first and second coating members 4 and 5, and then, as shown in FIG. 27D, the optical fiber cable 1, etc. are coated with a third coating member (contracting tube) 7 composed of a rubber, or the like. And, as shown in FIG. 28, a generally U-shaped fixing metal piece 8 is secured to the fixed-member 10 by screws 9 to thereby fix the optical fiber cable 1 to the fixed-member 10. The reason why the reinforcing metal piece 6 is employed is to prevent deterioration in optical transmission characteristics caused by stress to the optical fibers 2 contained in the optical fiber cable 1. The excessive length portions of the optical fibers 2 are appropriately treated and thereafter, the optical fibers are connected to the light transmitting device through an optical connector.

However, according to this conventional technique, when the specifications of the optical fiber cable (for example, diameter of the optical fiber cable) is changed, it becomes necessary to change or modify the reinforcing metal piece and the U-shaped fixing metal piece. Thus, the conventional technique lacks versatility. Furthermore, in a light transmitting device in which a number of optical fibers are introduced, because the fixing position of the optical fiber cable is established, it is necessary to appropriately treat the excessive length portions of the optical fibers in accordance with the connecting position of the optical fibers to the light transmitting device. Therefore, a space for the treatment is necessary.

SUMMARY OF THE INVENTION

It is, therefore, an object of the present invention to provide an optical fiber cable fixing structure which is capable of properly meeting any optical fiber cable of a wide range of diameters without deteriorating optical transmission characteristics thereof when the optical fiber cable is fixed to the fixed-member.

Another object of the present invention is to provide an optical fiber cable fixing structure in which an excessive length treatment of the optical fiber cable can be totally or partly omitted.

A further object of the present invention is to provide an optical fiber cable fixing holder which is capable of fixing the optical fiber cable with an appropriate amount of pressing force and without incurring undue stress to the optical fiber cable.

In accordance with an aspect of the present invention, there is provided an optical fiber cable fixing structure comprising a fixed-member; a first cable holding member fixed to the fixed-member, the first cable holding member having an arcuate first inner peripheral surface which is to be contacted with a side surface of the optical fiber cable; a second cable holding member slidably mounted on the fixed-member for sliding toward and away from the first cable holding member, the second cable holding member having an arcuate second inner peripheral surface which is to be contacted with a side surface of the optical fiber cable; and stopper means adapted to removably fix the second cable holding member to any desired position.

According to the optical fiber cable fixing structure thus constructed according to the present invention, by sliding the second cable holding member toward the first cable holding member, the optical fiber cable is held between the first and second cable holding members and firmly fixed to the fixed-member. Therefore, this structure can properly meet any optical fiber cable to be fixed, having a wide range of diameters.

Preferably, at least one of the first and second cable holding members is provided on the arcuate inner peripheral surface thereof with a plurality of protuberances. Accordingly, since a strong holding force of the first and second cable holding members with respect to the optical fiber cable is not required, the optical fiber cable can be firmly fixed without incurring undue stress to the optical fibers.

The fixed-member includes a guide groove which is inclined relative to a longitudinal direction of the optical fiber cable fixed to the fixed-member, and the second cable holding member is provided on a contacting surface thereof with respect to the fixed-member with a pin member which is to be loosely fitted into the guide groove of the fixed-member. The pin member is provided at a distal end thereof with an escape preventive portion which is larger than the width of the guide groove, and the fixed-member has a through-hole which is continuous to the guide groove and which is slightly larger than the escape preventive portion.

The stopper means includes a ratchet member having a plurality of teeth, the teeth being capable of sliding in advancing and retreating directions relative to the guide groove, and means for biasing the ratchet member so that the teeth may advance to the guide groove.

The second cable holding member can be slid toward the first cable holding member along the guide groove by the ratchet member and the biasing means. However, the second cable holding member is not slid in a direction away from the first cable holding member. Therefore, the second cable holding member can be slid to any appropriate position. If the sliding position of the second cable holding member is preliminarily established in accordance with the diameter of the optical fiber cable which is required to be fixed, the optical fiber cable can be fixed with an appropriate amount of pressing force, without incurring undue stress to the cable.

For changing the fixing position of the optical fiber cable, the stopper means is canceled to allow the second cable holding member to slide away from the optical fiber cable. Then, the position of the optical fiber cable is changed and the second cable holding member is slid again toward the optical fiber cable for fixture.

In accordance with another aspect of the present invention, there is provided an optical fiber cable fixing holder comprising a female holder including a first semi-cylindrical member having a first tapered portion on an inner peripheral wall thereof, the tapered portion having a first thread, a second semi-cylindrical member having a second tapered portion on an inner peripheral wall thereof, the second tapered portion having a second thread which forms a tapered female-threaded portion which is continuous to the first thread of the first semi-cylindrical member when the second semi-cylindrical member is united with the first semi-cylindrical member, and female holder uniting means for uniting the first semi-cylindrical member with the second semi-cylindrical member; and a male holder including a third semi-cylindrical member having a third tapered portion on an outer peripheral wall thereof, the third tapered portion having a third thread, a fourth semi-cylindrical member having a fourth tapered portion on an outer peripheral wall thereof, the fourth tapered portion having a first thread which forms a tapered male-threaded portion which is continuous to the third thread portion of the third semi-cylindrical member when the fourth semi-cylindrical member is united with the third semi-cylindrical member, and male holder uniting means for uniting the third semi-cylindrical member with the fourth semi-cylindrical member; the male-threaded portion of the male holder being elastically inwardly deformed in accordance with a screwing amount thereof by screwing the male-threaded portion of the male holder into the female-threaded portion of the female holder.

For mounting the female holder on the optical fiber cable, the first semi-cylindrical member and the second semi-cylindrical member are arranged along the optical fiber cable which is required to be fixed, and then united by the female holder uniting means. Similarly, for mounting the male holder on the optical fiber cable, the third semi-cylindrical member and the fourth semi-cylindrical member are arranged along the optical fiber cable which is required to be fixed, and then united by the male holder uniting means. At that time, the male is mounted such that the male-threaded portion is placed opposite to the female-threaded portion.

Subsequently, when the male-threaded portion of the male holder is screwed into the female-threaded portion of the female holder, the male-threaded portion is elastically inwardly deformed to press the optical fiber cable. As a result, the optical fiber cable fixing holder is fixed to the optical fiber cable.

This optical cable fixing holder is fixed to the fixed-member by a generally U-shaped fixing metal piece as shown in the prior art, or the like. As a result, the optical fiber cable is fixed to the fixed-member through the fixing holder.

Preferably, the male holder includes a plurality of protuberances which are formed on that side of the inner peripheral wall opposite to that side of the inner peripheral wall on which the threads of the male-threaded portion are formed. Accordingly, since a strong holding force of the male-threaded portion with respect to the optical fiber cable is not required, the optical fiber cable can be fixed firmly, without incurring undue stress to the optical fibers contained in the optical fiber cable.

Furthermore, since the male-threaded portions of the male holder are deformed inwardly in accordance with the screwing amount of the male-threaded portions into the female-threaded portions, any change of the diameter of the optical fiber cable can be met properly. Moreover, if the screwing amount is preliminarily established in accordance with the diameter of optical fiber cable, the optical fiber cable can be fixed with an appropriate amount of pressing force, without incurring undue stress to the optical fibers contained in the cable.

For changing the fixing position of the optical fiber cable, by loosening the screwing magnitude of the male-threaded portion of the male holder into the female-threaded portion of the female holder, the pressing force of the male-threaded portion to the optical fiber cable is removed and then, by changing the position of the optical fiber cable, the male holder is screwed again into the female holder so that the optical fiber cable is fixed.

In accordance with a further aspect of the present invention, there is provided an optical fiber cable fixing holder comprising a main holder which is to be directly mounted on the optical fiber cable, the main holder including a first semi-cylindrical member, a second semi-cylindrical member, and main holder uniting means for uniting the first semi-cylindrical member with the second semi-cylindrical member; and a secondary holder which is to be mounted on the main holder, the secondary holder including a third semi-cylindrical member, a fourth semi-cylindrical member, and secondary holder uniting means for uniting the third semi-cylindrical member with the fourth semi-cylindrical member; at least one of the first and second semi-cylindrical members further including a pressing portion, the pressing portion elastically deforming the secondary holder in accordance with a sliding position of the secondary holder when the secondary holder is slidably mounted relative to the main holder.

The main holder is directly mounted on the optical fiber cable which is to be fixed, by arranging the first and second semi-cylindrical members along the optical fiber cable and uniting the first and second semi-cylindrical members by the main holder uniting means. The secondary holder is slidably mounted on the main holder. When the secondary holder is slid along the main holder, the pressing portion of the main holder is elastically inwardly deformed in accordance with the sliding amount of the secondary holder and presses the optical fiber cable. As a result, the optical fiber cable fixing holder is fixed to the optical fiber cable.

This optical cable fixing holder is fixed to the fixed-member by a generally U-shaped fixing metal piece as shown in the prior art, or the like. As a result, the optical fiber cable is fixed to the fixed-member through the fixing holder.

Preferably, the pressing portion of the first semi-cylindrical member includes a plurality of protuberances formed on an inner peripheral surface thereof. The main holder includes a plurality of position establishing grooves for stepwise establishing a sliding position of the secondary holder, the secondary holder having a locking protruded-portion which is to be inserted into the position establishing grooves.

Furthermore, because the pressing portion of the main holder includes a plurality of protuberances formed on an inner peripheral surface thereof, a strong holding force of the pressing portion with respect to the optical fiber cable is not required. Therefore, the optical fiber cable can be firmly fixed without incurring undue stress to the optical fibers. Moreover, because the pressing portion of the main holder is inwardly deformed in accordance with the sliding amount of the secondary holder, it can properly meet any change of the diameter of the optical fiber cable. If the sliding amount of the secondary holder is preliminarily established in accordance with the diameter of the optical fiber cable which is required to be fixed, the optical fiber cable can be fixed with an appropriate amount of pressing force, without incurring undue stress to the optical fibers.

For changing the fixing position of the optical fiber cable, the secondary holder is slid in the reverse direction to remove the pressing force of the pressing portion to the optical fiber cable. Then, the position of the optical fiber cable is changed and the secondary holder is slid again to thereby fix the optical fiber cable. Accordingly, the fixing position of the optical fiber cable can easily be changed.

In accordance with a still further aspect of the present invention, there is provided an optical fiber cable comprising a plurality of optical fibers; a first coating member for coating the optical fibers; a plurality of ring members spacedly arranged on an outer side of the first coating member; and a second coating member for coating the first coating member and the ring members.

Since this optical fiber cable has a plurality of ring members spacedly arranged between the first and second coating members, the optical fiber cable is fixed to the fixed-member at a location where the ring members are located. Owing to this arrangement, the optical fiber cable can be firmly fixed without incurring undue stress to the optical fibers contained in the optical fiber cable.

The above and other objects, features and advantages of the present invention and the manner of realizing them will become more apparent, and the invention itself will be best understood from a study of the following description and appended claims with reference to the attached drawings showing some preferred embodiments of the invention.

BRIEF DESCRIPTION OF THE DRAWINGS

FIG. 8A is a front view of a first semi-cylindrical member of the second embodiment;

FIG. 8B is a plan view thereof;

FIG. 8C is a bottom view thereof;

FIG. 8D is a left side view thereof;

FIG. 8E is a right side view thereof;

FIG. 9A is a front view of a second semi-cylindrical member of the second embodiment;

FIG. 9B is a plan view thereof;

FIG. 9C is a bottom view thereof;

FIG. 9D is a left side view thereof;

FIG. 9E is a right side view thereof;

FIG. 10A is a front view of a third semi-cylindrical member of the second embodiment;

FIG. 10B is a plan view thereof;

FIG. 10C is a bottom view thereof;

FIG. 10D is a left side view thereof;

FIG. 10E is a right side view thereof;

FIG. 11A is a front view of a fourth semi-cylindrical member of the second embodiment;

FIG. 11B is a plan view thereof;

FIG. 11C is a bottom view thereof;

FIG. 11D is a left side view thereof;

FIG. 11E is a right side view thereof;

FIG. 18A is a front view of the second semi-cylindrical member of the third embodiment;

FIG. 18B is a plan view thereof;

FIG. 18C is a bottom view thereof;

FIG. 18D is a left side view thereof;

FIG. 18E is a right side view thereof;

FIG. 20A is a front view of a fourth semi-cylindrical member of the third embodiment;

FIG. 20B is a plan view thereof;

FIG. 20C is a bottom view thereof;

FIG. 20D is a left side view thereof;

FIG. 20E is a right side view thereof;

DESCRIPTION OF THE PREFERRED EMBODIMENTS

Some embodiments of the present invention will be described with reference to the accompanying drawings.

(1) First Embodiment

Figure 1:
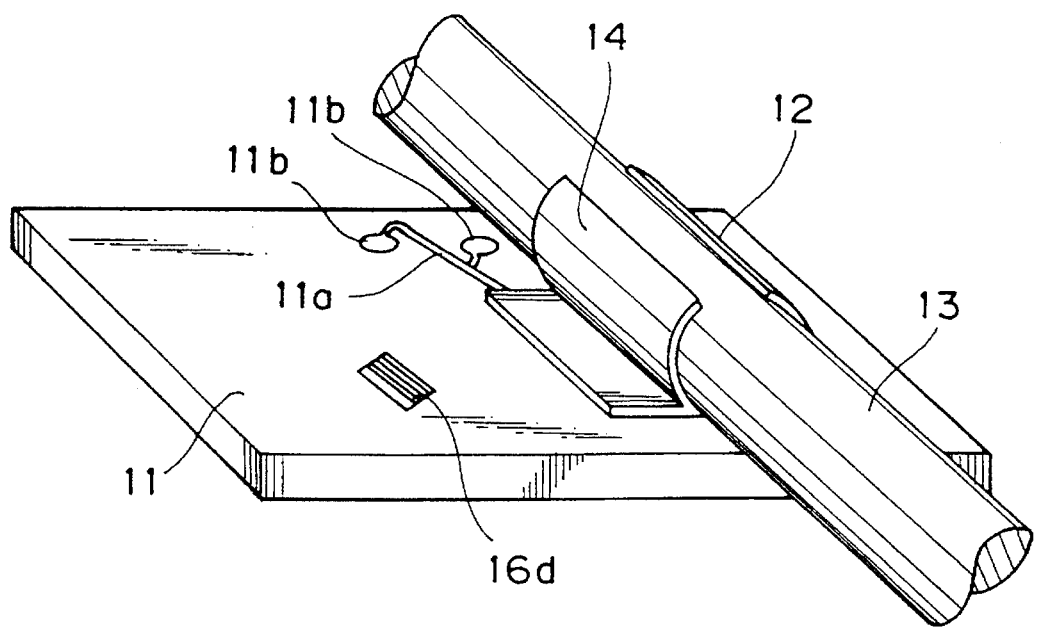
FIG. 1 is a perspective view showing a fixing structure according to a first embodiment of the present invention.
Figure 2:
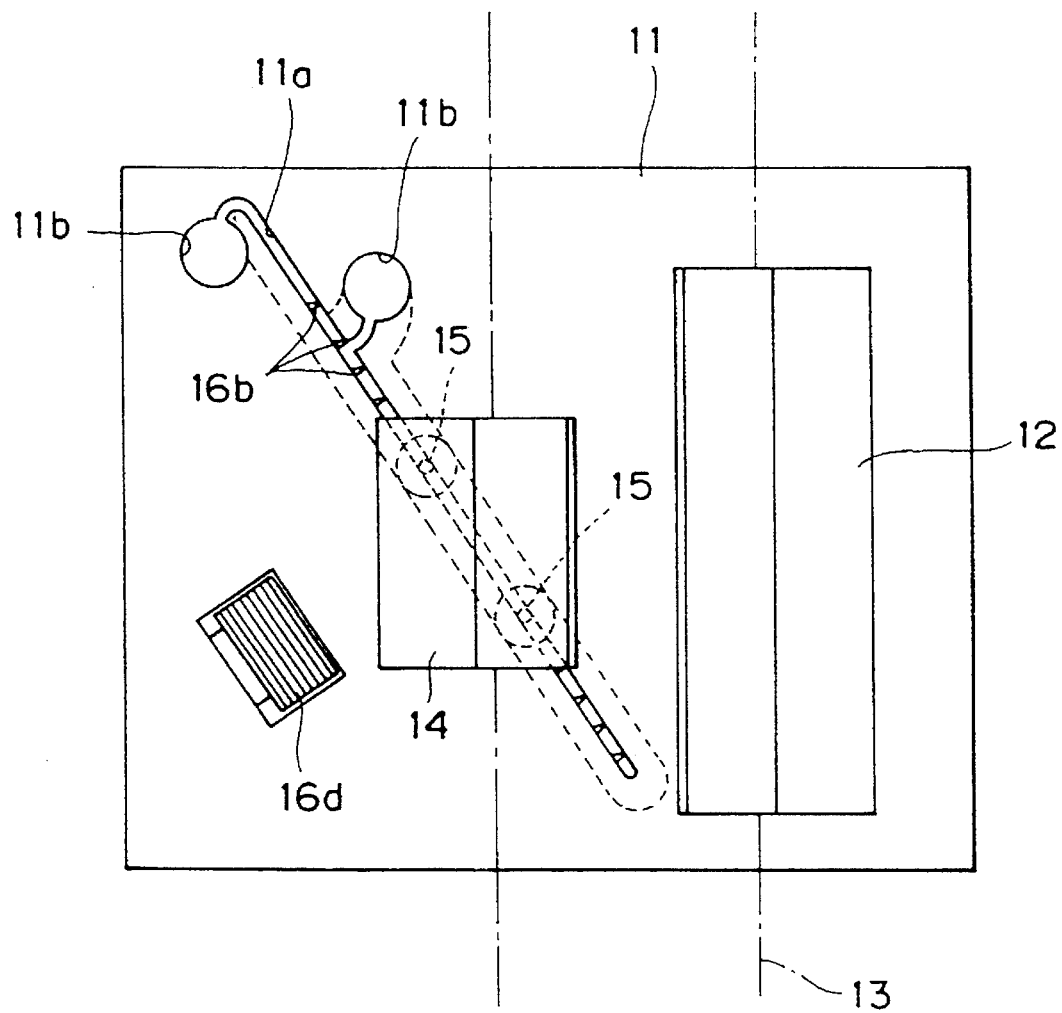
FIG. 2 is a plan view of the fixing structure according to the first embodiment.
Figure 3A:
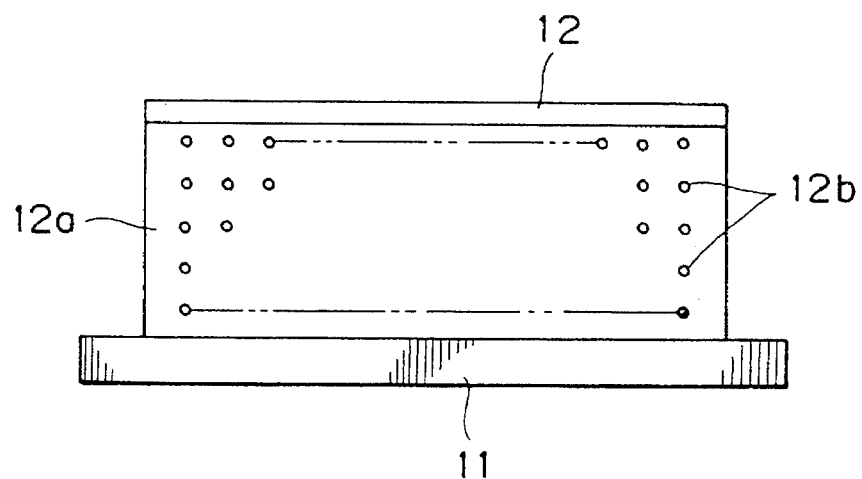
FIG. 3A is a front view of a first cable holding member used in the first embodiment.
Figure 3B:
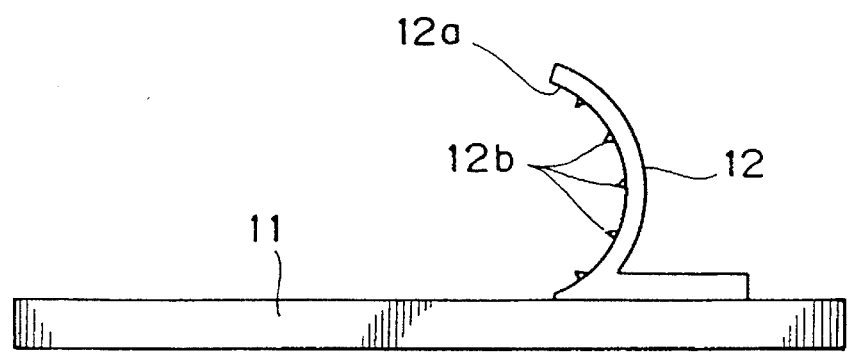
FIG. 3B is a side view thereof.
Figure 4C:
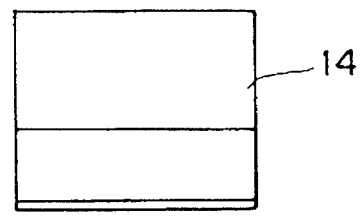
FIG. 4C is a plan view thereof.
Figures 4A, 4B:
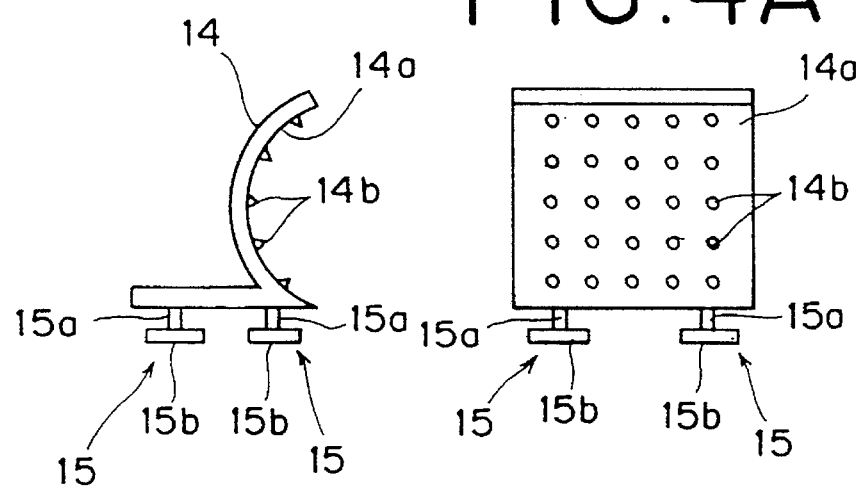
FIG. 4A is a front view of a second cable holding member used in the first embodiment.
FIG. 4B is a side view thereof.
Figure 4D:
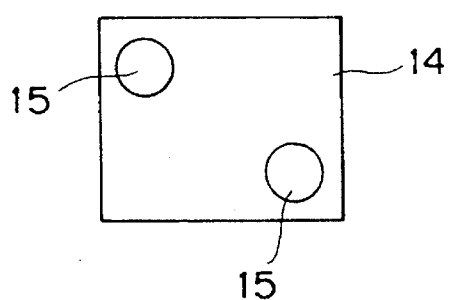
FIG. 4D is a bottom view thereof.

Referring first to FIGS. 1 and 2, reference numeral 11 denotes a fixed-member, such as, a member which constitutes a part of a housing of an light transmitting device or the like, or a member which is mounted on the housing. A first cable holding member 12 is mounted on the fixed-member 11. As illustrated in detail in FIGS. 3A and 3B, the first cable holding member 12 has an inner surface 12a which is formed in a generally arcuate configuration in order to facilitate its contact with a side portion of an optical fiber cable 13 which is required to be fixed. The first cable holding member 12 is firmly secured to the fixed-member 11. On the inner surface 12a, a plurality of protuberances 12b, each having a sharp tip, are arranged in array.

In FIGS. 1 and 2, a guide groove 11a is formed in an upper surface of the fixed-member 11, the guide groove 11a being angled relative to a laying direction of the optical fiber cable 13, i.e., a longitudinal direction of the first cable holding member 12, and formed substantially all the way through the fixed-member 11 from the top to the bottom, as shown in FIG. 2. A pair of through-holes 11b communicating with the guide groove 11a are formed in a rear end of the guide groove 11 and in the vicinity of the rear end. Reference numeral 14 denotes a second cable holding member. As illustrated in detail in FIGS. 4A to 4D, the second cable holding member 14 includes an inner surface 14a which is formed in a generally arcuate configuration in order to facilitate its contact with a side portion of the optical fiber cable 13 which is required to be fixed. On this inner surface 14a, a plurality of protuberances 14b each having a sharp tip are arranged in array.

On a lower surface of the second cable holding member 14, a pair of pin members 15, 15 are integrally mounted. Each pin member 15 comprises a neck portion 15a and an escape preventive portion 15b formed on a distal end of the pin member 15. The diameter of the neck portion 15a is set slightly smaller than the width of the guide groove 11a, while the diameter of the escape preventive portion 15b is set slightly smaller than the diameter of each through-hole 11b. By inserting the pair of pin members 15 into the pair of through-holes 11b and rotating the holding member 14, the second cable holding member 14 is introduced into the guide groove 11a, so that the second cable holding member 14 can be slid along the guide groove 11a.

Figure 5:
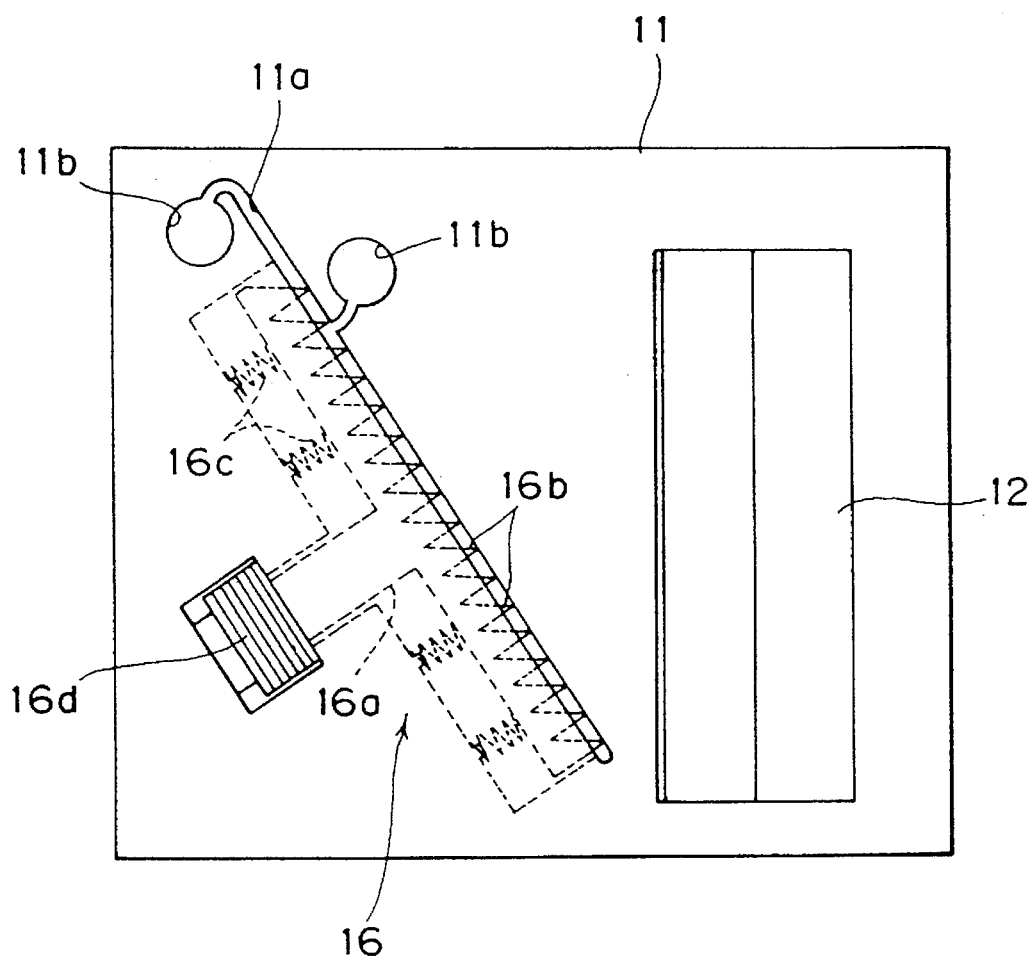
FIG. 5 is a plan view showing a stopper means used in the first embodiment.

Next, the stopper means 16 will be described. As is shown in FIG. 5, on a lower surface side or reverse surface side of the fixed-member 11, a ratchet member 16a is slidably mounted for sliding in a direction generally perpendicular to the guide groove 11a. A plurality of teeth 16b are formed on that side of the ratchet member where the guide groove 11a is formed. The ratchet member 16a is biased by a plurality of biasing members (although a coil spring 16c is shown in FIG. 5, it may be an elastic member such as a rubber) such that the teeth 16b are advanced to the guide groove 11a. On an upper surface side, or front surface side, of the fixed-member 11, a canceling switch 16d integral with the rachet member 16a is provided. By sliding the canceling switch 16d, the teeth 16b of the ratchet member 16a can be retreated from the guide groove 11a.

The configuration of each tooth 16b of the ratchet member 16a is designed such that when the second cable holding member 14 is slid toward the first cable holding member 12, along the guide groove 11a, the ratchet member 16a is retreated by the teeth 16b of the ratchet members 16a against the biasing force of the biasing member 16c, and when the second cable holding member 14 is to be slid away from the first cable holding member 12, the sliding movement of the second cable holding member 14 is prevented by the teeth 16b.

By laying the optical fiber cable 13 to be fixed along the first cable holding member 12 and then sliding the second cable holding member 14 to hold the optical fiber cable 13 between the first and second cable holding members 12 and 14, FIGS. 1 and 2, the optical fiber cable 13 can be fixed to the fixed-member 11. For removing the optical fiber cable 13 from the fixed-member 11, the release switch 16d is slid to cause the teeth 16b to retreat from the guide groove 11a, and in that condition, the second cable holding member 14 is slid in a direction spaced away from the optical fiber cable 13.

According to this embodiment, the fixture of the optical fiber cable 13 to the fixed-member 11 can be done by merely sliding the second cable holding member 14. Thus, the fixing work is very simple. Also, since the optical fiber cable 13 can be removed from the fixed-member 11 by sliding the canceling switch 16d and the second cable holding member 14, the removing work is very easy. Accordingly, the fixing position of the optical fiber cable 13 can easily be changed, and the excessive length treatment of the optical fiber cable 13 or optical fibers can be totally or partly omitted.

Even in case an optical fiber cable, which is required to be fixed, has a wide range of diameters, the difference in diameter can be absorbed by means of sliding the second cable holding member 14 and therefore, a favorable versatility is available. Furthermore, because the plurality of protuberances 12b and 14b are provided on the inner surfaces 12a and 14a of the first and second cable holding members 12 and 14, respectively, it is not necessary to press the optical fiber cable 13 with undue force. Thus, stress to the optical fiber cable 13 can be diminished, and at the same time, the optical fiber cable 13 can be firmly fixed to the fixed-member 11. By preliminarily establishing the sliding position of the second cable holding member 14 in accordance with the diameter of the optical fiber cable 13 which is required to be fixed, the stress to the optical fiber cable 13 can be limited into a predetermined range.

(2) Second Embodiment

Figure 6:
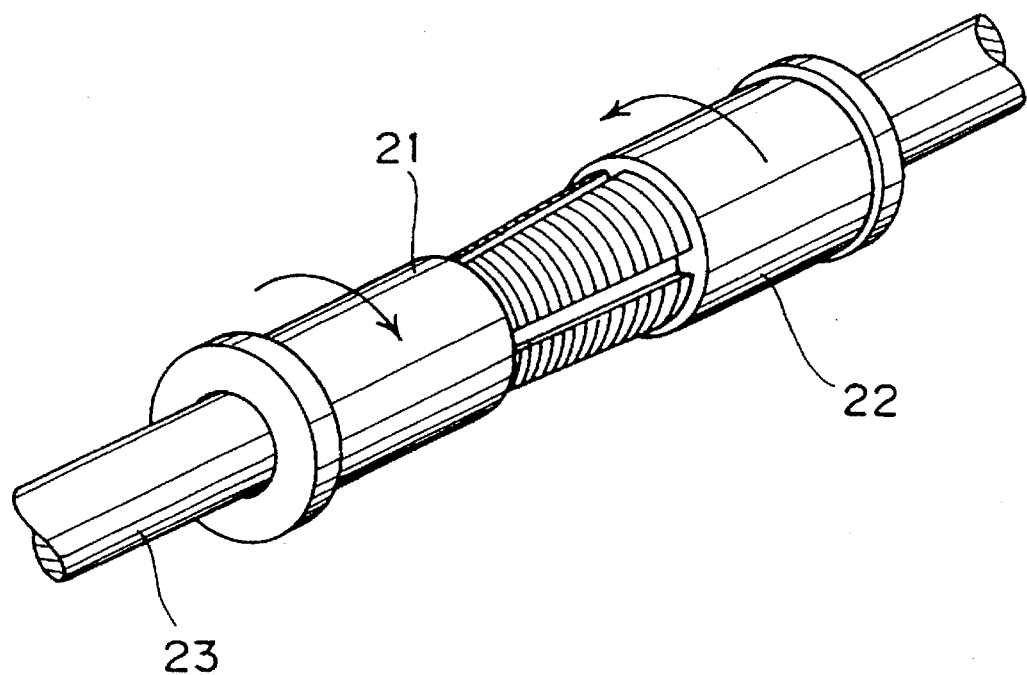
FIG. 6 is a perspective view of an optical fiber cable fixing holder according to a second embodiment of the present invention.
Figure 7:
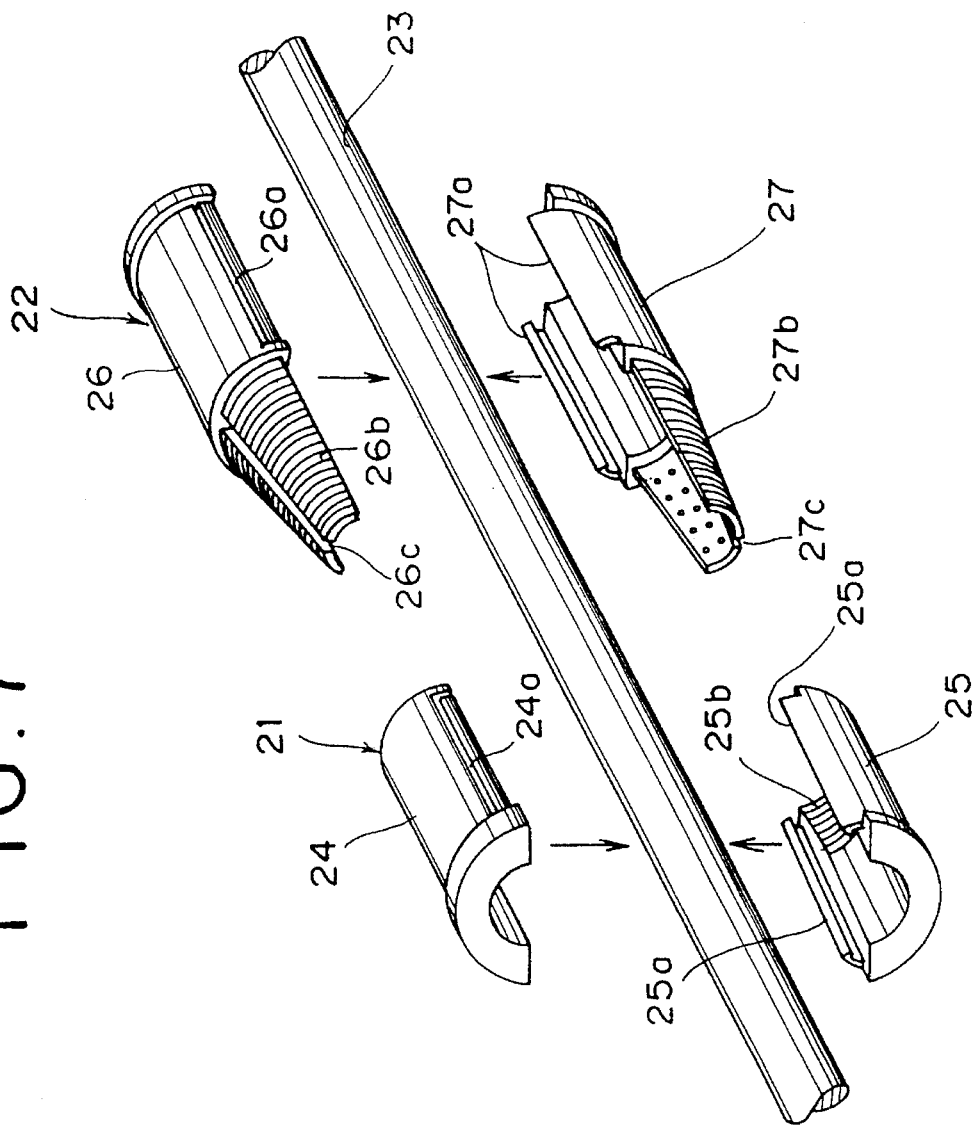
FIG. 7 is an exploded perspective view of the second embodiment.

Referring to FIGS. 6 to 14, a second embodiment of the present invention will be described. As is shown in FIG. 6, an optical fiber cable fixing holder, according to the second embodiment, comprises a female holder 21 and a male holder 22. Reference numeral 23 denotes an optical fiber cable. As is shown in FIG. 7, the female holder 21 comprises a first semi-cylindrical member 24 and a second semi-cylindrical member 25, while the male holder 22 comprises a third semi-cylindrical member 26 and a fourth semi-cylindrical member 27.

As illustrated in detail in FIGS. 8A to 8E, the first semi-cylindrical member 24 is a generally semi-cylindrically formed member, having a pair of lock grooves 24a, FIG. 7, formed in an outer wall thereof and a thread (thread ridge) formed on a first tapered portion 24b, FIG. 8E, of a part of an inner peripheral wall thereof. Likewise, as illustrated in detail in FIGS. 9A to 9E, the second semi-cylindrical formed member, having a pair of lock pawls for engagement in the lock grooves 24a of the first semi-cylindrical member 24 in order to removably unite the second semi-cylindrical member 25 with the first semi-cylindrical member 24, and a thread formed on a second tapered portion 25b of a part of an inner peripheral wall thereof and which is continuous to the thread of the first tapered portion 24b of the first semi-cylindrical member 24 to constitute tapered female-threaded portions (24b, 25b) when the second semi-cylindrical member 25 is united with the first semi-cylindrical member 24.

As illustrated in FIGS. 10A to 10E, the third semi-cylindrical member 26 is a generally semi-cylindrically formed member, having a pair of lock grooves 26a formed in an outer wall thereof and a thread formed on a first tapered portion 26b of a part of the outer wall. A split groove 26c is formed in the third tapered portion 26b so that the latter can be elastically deformed inwardly. A plurality of protuberances 26d, each having a sharp tip, are formed on an inner surface of the third tapered portion 26b.

As illustrated in FIGS. 11A to 11E, the fourth semi-cylindrical member 27 is a generally semi-cylindrically formed member, having a pair of lock pawls 27a for engagement in the lock grooves 26a of the third semi-cylindrical member 26, in order to removably unite the fourth semi-cylindrical member 27 with the third semi-cylindrical member 26, and a thread formed on a fourth tapered portion 27b of a part of an inner peripheral wall thereof and which is continuous to the thread of the first tapered portion 26b of the first semi-cylindrical member 26 to constitute tapered male-threaded portions (26b, 27b) when the fourth semi-cylindrical member 27 is united with the third semi-cylindrical member 26. A split groove 27c is formed in the fourth tapered portion 27b so that the latter can be elastically deformed inwardly. A plurality of protuberances 27d, each having a sharp tip, are formed on an inner surface of the fourth tapered portion 27b.

As shown in FIG. 7, for mounting the female holder 21, the first semi-cylindrical member 24 and the second semi-cylindrical member 25 are arranged along the optical fiber cable 23 and the lock pawls 25a are engaged in the lock grooves 24a, respectively, in order to unite the first semi-cylindrical member 24 with the second semi-cylindrical member 25. Similarly, for mounting the male holder 22, the third semi-cylindrical member 26 and the fourth semi-cylindrical member 27 are arranged along the optical fiber cable and the lock pawls 27a are engaged in the lock grooves 26a, respectively, in order to unite the third semi-cylindrical member 26 with the fourth semi-cylindrical member 27. At that time, the male holder 22 is mounted such that the male-threaded portions (24b, 27b) of the male holder 22 are placed opposite to the female-threaded portions (24b, 25b) of the female holder 21.

Figure 12A:
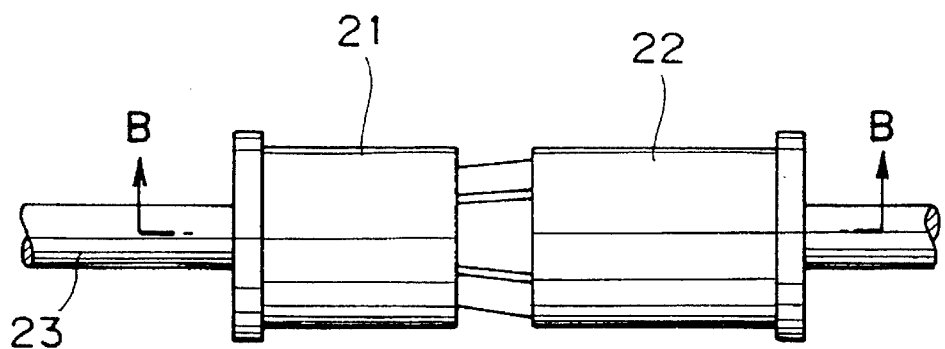
FIG. 12A is a front view showing an overall construction of the second embodiment.
Figure 12B:
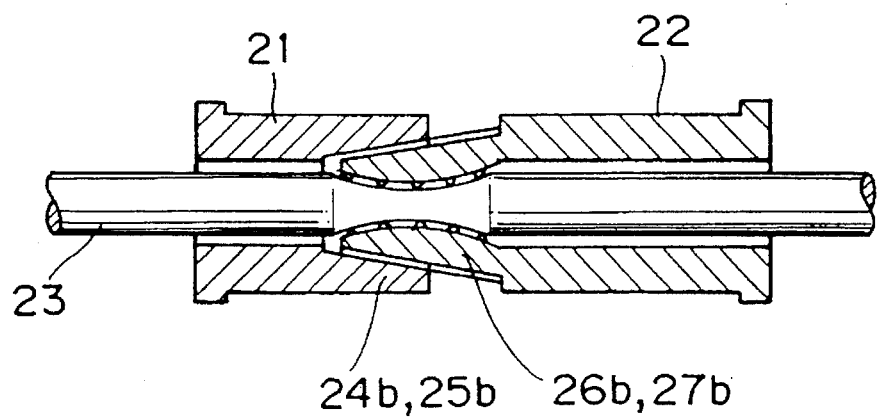
FIG. 12B is a sectional view thereof.
Figure 13:
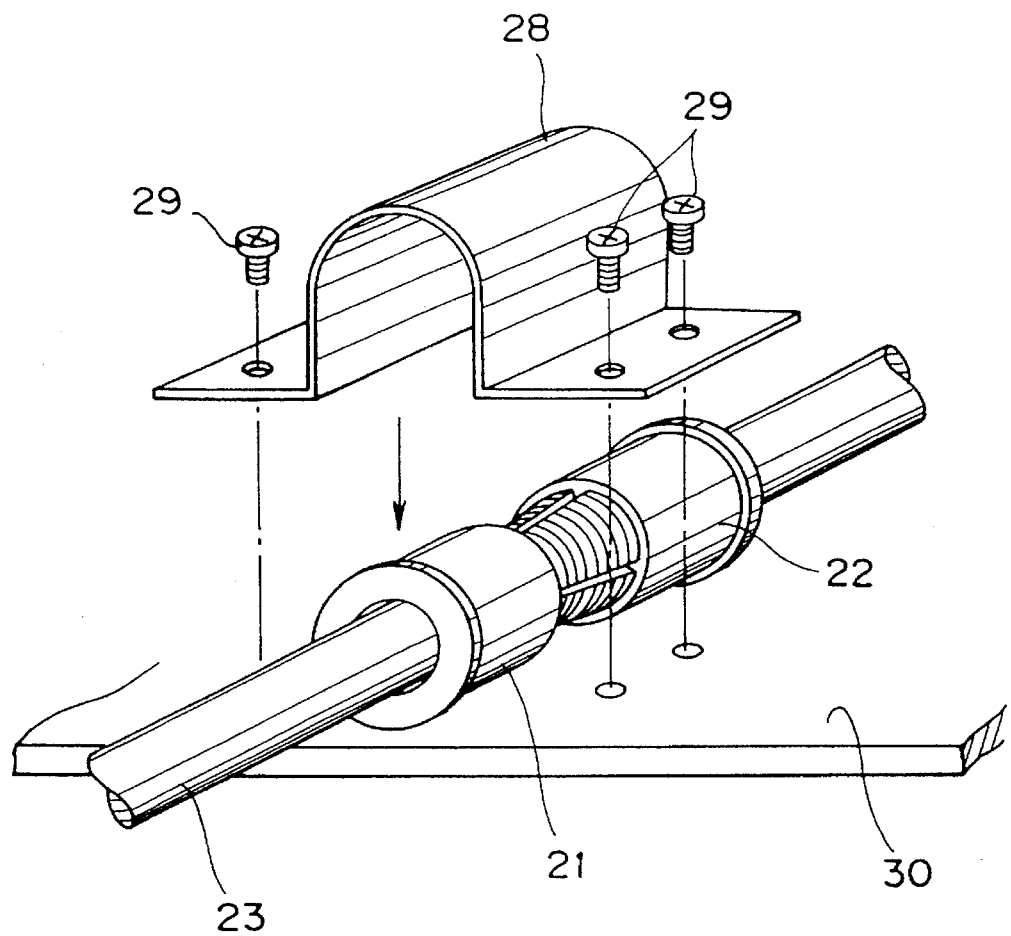
FIG. 13 is an exploded perspective view showing an optical fiber cable fixing structure, in which the optical fiber cable fixing holder according to the second embodiment of the present invention is used.
Figure 14:
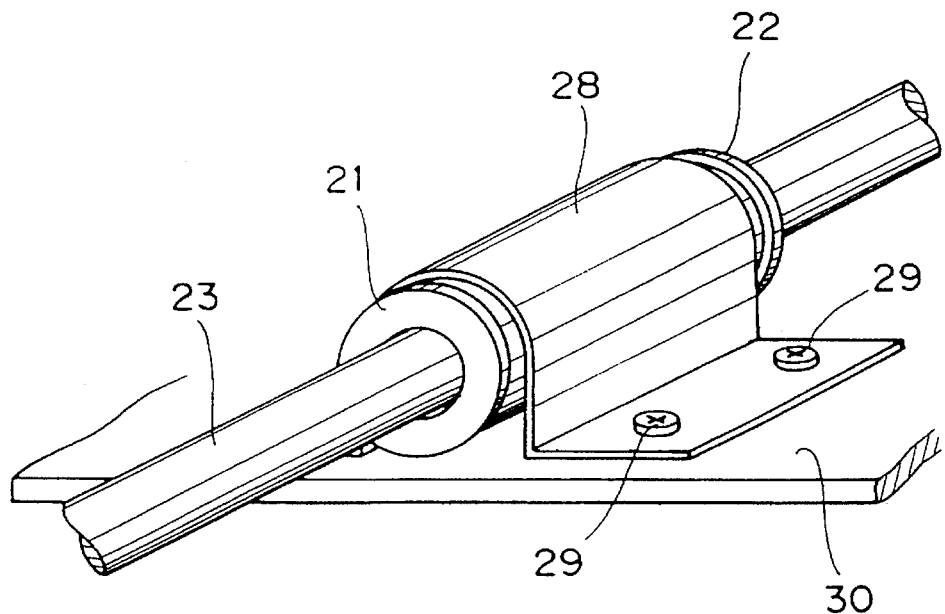
FIG. 14 is a perspective thereof.

When the male-threaded portions (26b, 27b) of the male holder 22 are screwed into appropriate position of the female-threaded portions (24b, 25b) of the female holder 21 as shown in FIG. 6, the male-threaded portions (26b, 27b) are elastically deformed inwardly, as shown in FIG. 12A, 12B, to press the optical fiber cable 23 and, as a result, the optical fiber cable fixing holder is fixed to the optical fiber cable 23. As shown in FIG. 13, 14, in the first optical fiber cable fixing holder, by fixing a generally U-shaped fixing metal piece 28 to a fixed-member 30, with the use of a plurality of screws 29, the optical fiber cable 23 is fixed to the fixed-member 30 through the optical fiber cable fixing holder.

According to this embodiment, because the plurality of protuberances 26d and 27d are provided on the inner surfaces of the male-threaded portions (26b and 27b) of the male holder 22, strong holding force of the male-threaded portions (26c, 27b) with respect to the optical fiber cable 23 is not required. Therefore, the optical fiber cable 23 can be firmly fixed without undue stress to the optical fibers within the cable. Furthermore, because the male-threaded portions (26b, 27b) of the male holder 22 are deformed inwardly in accordance with the screwing amount of the male-threaded portions (26b, 27b) into the female-threaded portions (24b, 25b), any change of the diameter of the optical fiber cable 23 can be met properly. Moreover, if the screwing amount is preliminarily established in accordance with the diameter of optical fiber cable 23, the optical fiber cable 23 can be fixed with an appropriate amount of pressing force, without incurring undue stress to the optical fibers contained in the cable.

For changing the fixing position of the optical fiber cable 23, a pressing force of the male-threaded portions (26b, 27b) to the optical fiber cable 23 is removed by loosening the screwing magnitude of the male-threaded portions (26b, 27b) to the female-threaded portions (24b, 25b), and thereafter the male-threaded portions (26b, 27b) are simply screwing again into the female-threaded portions (24b, 25b). Therefore, the excessive length treatment to the optical fiber cable 23 or optical fibers can be totally or partly omitted.

(3) Third Embodiment

Figure 15:
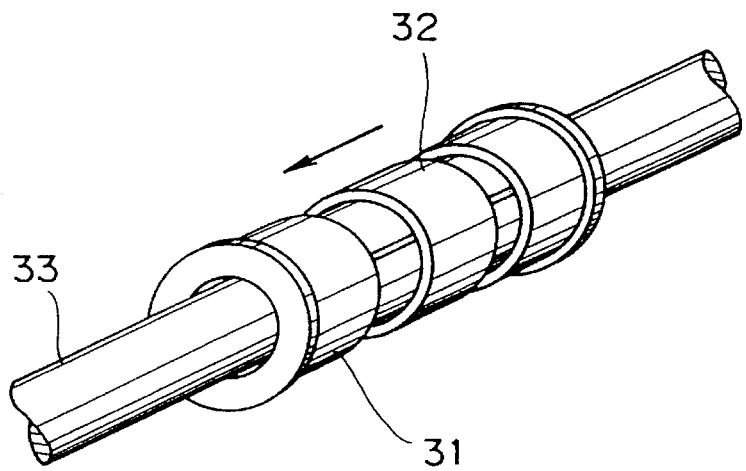
FIG. 15 is a perspective view of an optical fiber cable fixing holder according to a third embodiment of the present invention.
Figure 16:
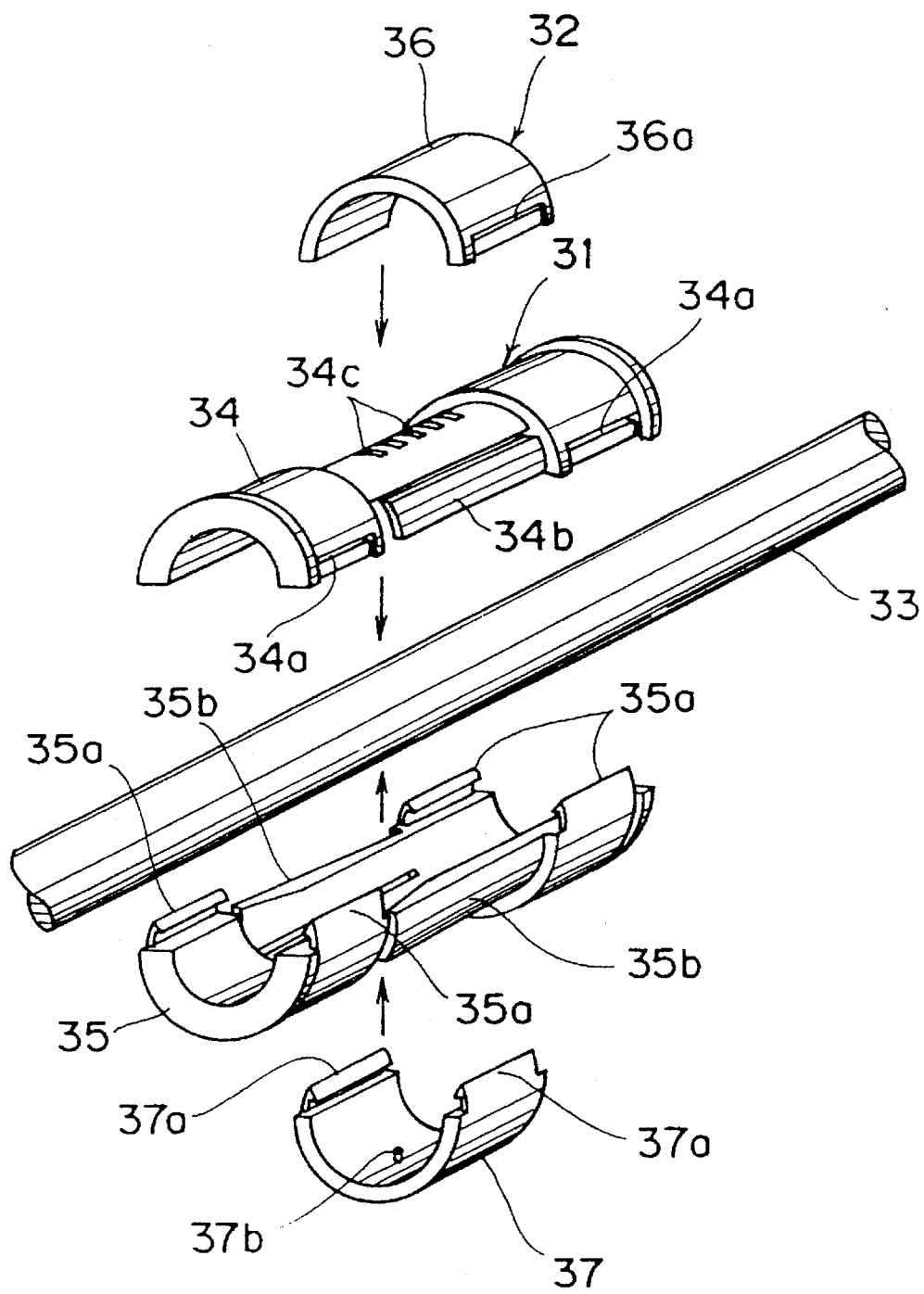
FIG. 16 is an exploded perspective view thereof.
Figure 17B:
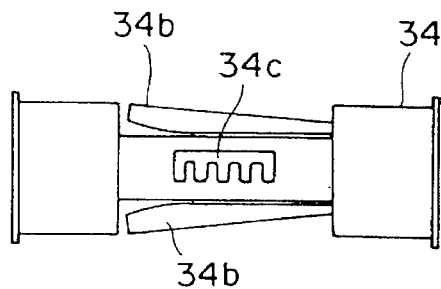
FIG. 17B is a plan view thereof.
Figures 17A, 17D, 17E:
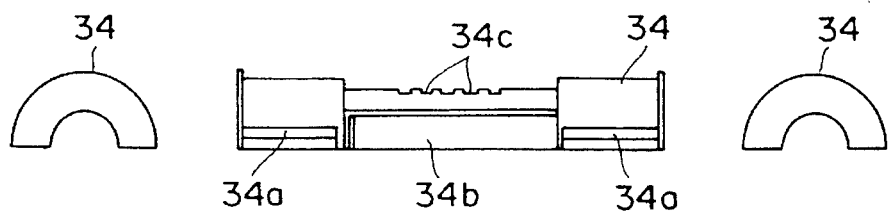
FIG. 17A is a front view of a first semi-cylindrical member of the third embodiment.
FIG. 17D is a left side view thereof.
FIG. 17E is a right side view thereof.
Figure 17C:
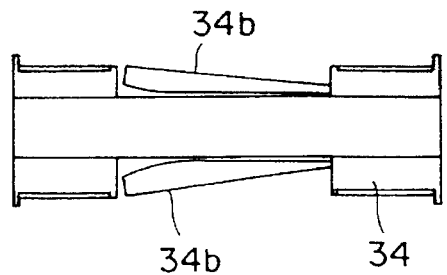
FIG. 17C is a bottom view thereof.
Figure 19B:
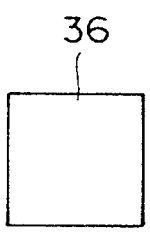
FIG. 19B is a plan view thereof.
Figure 19D:
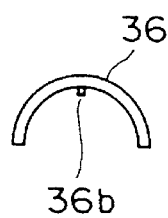
FIG. 19D is a left side view thereof.
Figure 19A:
FIG. 19A is a front view of the third semi-cylindrical member of the third embodiment.
Figure 19E:
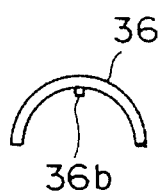
FIG. 19E is a right side view thereof.
Figure 19C:
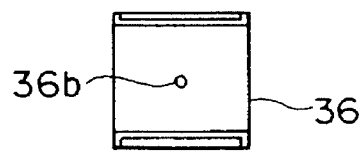
FIG. 19C is a bottom view thereof.

Referring to FIGS. 15 to 23, a third embodiment of the present invention will be described. As is shown in FIG. 15, an optical fiber cable fixing holder according to the third embodiment comprises a main holder 31 and a secondary holder 32. Reference numeral 33 denotes an optical fiber cable. As is shown in FIG. 16, the main holder 31 comprises a first semi-cylindrical member 34 and a second semi-cylindrical member 35, while the secondary holder 32 comprises a third semi-cylindrical member 36 and a fourth semi-cylindrical member 37.

As illustrated in detail in FIGS. 17A to 17E, the first semi-cylindrical member 34 is a generally semi-cylindrically formed member and has a pair of lock grooves 34a formed in the vicinity of opposite end portions of each side of an outer wall thereof, and at an intermediate portion thereof, the first semi-cylindrical member 34 has a pair of pressing portions 34b, a basal portion of each of which is integrally fixed and each of which is opened outwardly toward a distal end thereof. The pressing portions 34b can be elastically inwardly deformed. A plurality of position establishing grooves 34c are formed in the vicinity of the central portion of the first semi-cylindrical member 34. The position establishing grooves 34c comprise a slide groove formed in a longitudinal direction of the first semi-cylindrical member 34 and a plurality of slide preventive grooves formed in a direction generally perpendicular to the slide groove.

As illustrated in detail in FIGS. 18A to 18E, the second semi-cylindrical member 35 is a generally semi-cylindrically formed member and a pair of lock pawls 35a adapted to engage respectively in the lock grooves 34a of the first semi-cylindrical member 34 so that the second semi-cylindrical member 35 can be removably united with the first semi-cylindrical member 34, and at an intermediate portion thereof, the second semi-cylindrical member 35 has a pair of pressing portions 35b, a basal portion of each of which is integrally fixed and each of which is opened outwardly toward a distal end thereof. The pressing portions 35b can be elastically inwardly deformed. A plurality of position establishing grooves 34c are formed in the vicinity of the central portion of the second semi-cylindrical member 35 in such a manner as corresponding to the position establishing grooves 34c of the first semi-cylindrical member 34. The position establishing grooves 35c comprise a slide groove formed in a longitudinal direction of the second semi-cylindrical member 35 and a plurality of slide preventive grooves formed in a direction generally perpendicular to the slide groove.

As illustrated in FIGS. 19A to 19E, the third semi-cylindrical member 36 is a generally semi-cylindrically formed member, having a pair of lock grooves 36a formed in an outer wall thereof and a protruded-portion 36b formed on an inner surface thereof. Similarly, as illustrated in FIGS. 20A to 20E, the fourth semi-cylindrical member 37 is a generally semi-cylindrically formed member, having a pair of lock pawls 37a for engaging respectively, in the lock grooves 36a of the third semi-cylindrical member 34 so that the fourth semi-cylindrical member 37 can be removably united with the third semi-cylindrical member 36. The fourth semi-cylindrical member 37 has a protruded-portion 37a formed on an inner surface thereof.

As shown in FIG. 16, for mounting the main holder 31, the first semi-cylindrical member 34 and the second semi-cylindrical member 35 are arranged along the optical fiber cable 33, and then, the lock pawls 35a are engaged in the lock grooves 34a, respectively. Similarly, for mounting the secondary holder 31, the third semi-cylindrical member 36 and the fourth semi-cylindrical member 36 are arranged along the main holder 31 and the lock pawls 37a are engaged in the lock grooves 36a, respectively. At that time, the protruded-portions 36b and 37b of the secondary holder 32 (third and fourth semi-cylindrical members) are inserted into the slide grooves of the position establishing grooves 34c and 35c, respectively.

Figure 21A:
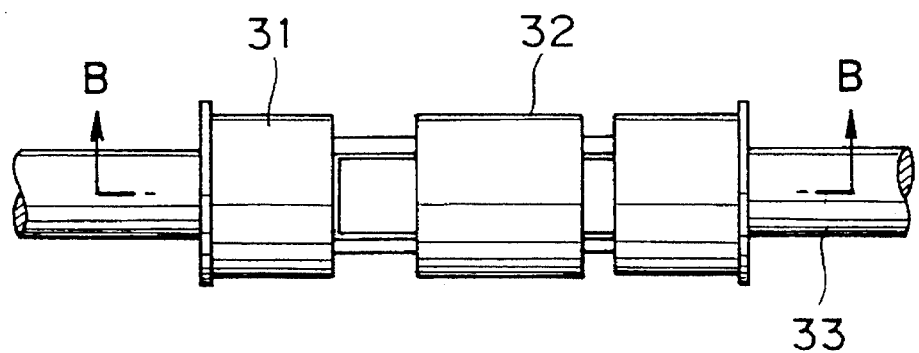
FIG. 21A is a front view showing an overall construction of the third embodiment.
Figure 21B:
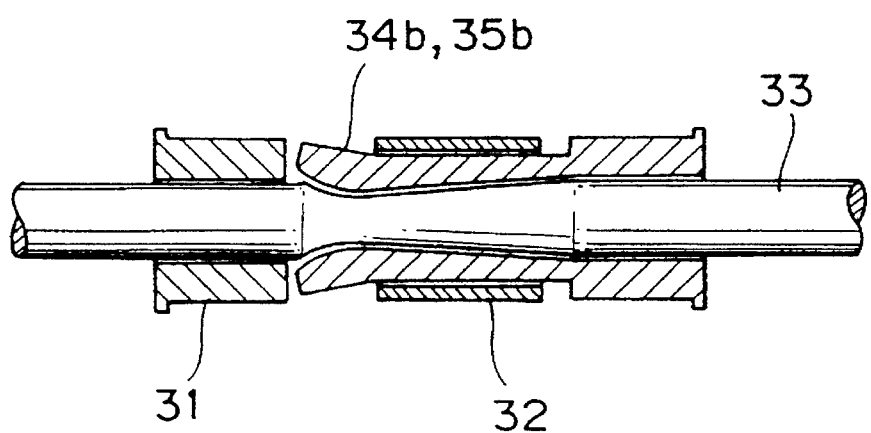
FIG. 21B is a sectional view thereof.
Figure 22:
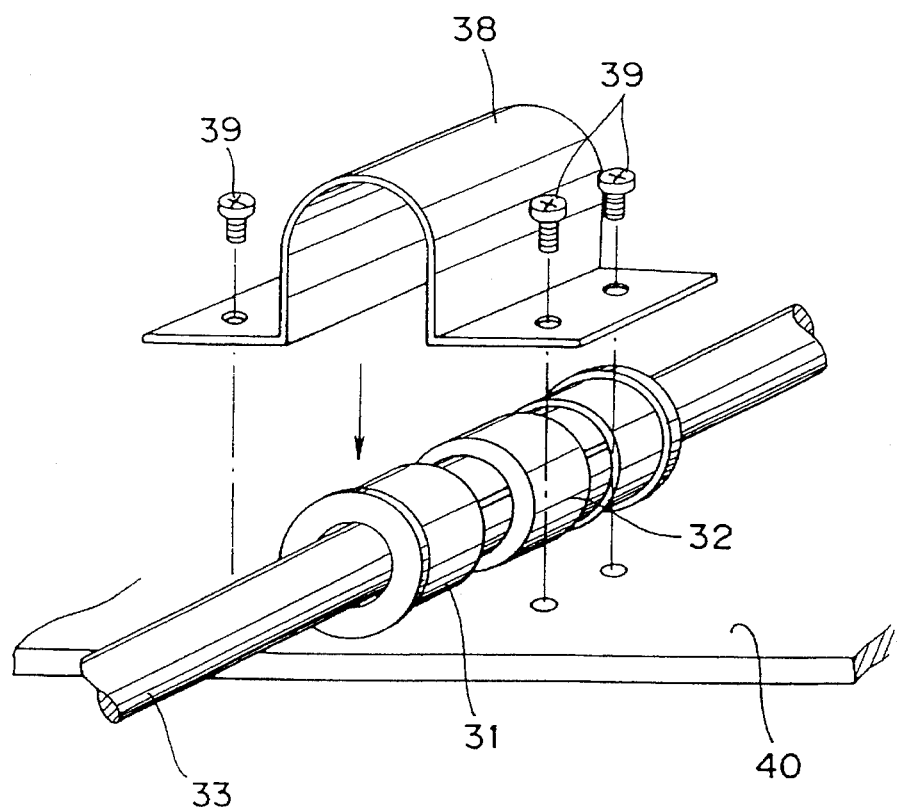
FIG. 22 is an exploded perspective view showing an optical fiber cable fixing structure in which the optical fiber cable fixing holder of the third embodiment is used.
Figure 23:
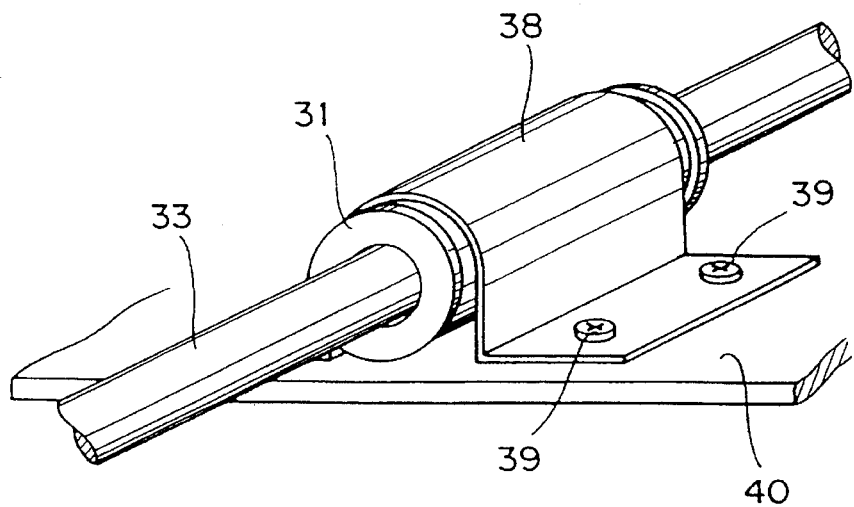
FIG. 23 is a perspective view thereof.

Next, as shown in FIG. 15, when the secondary holder 32 is slid to any appropriate position in the longitudinal direction of the main holder 31, the pressing portions 34b and 35b are elastically inwardly deformed, as shown in FIG. 21A or 21B, to press the optical fiber cable 33. As a result, the optical fiber cable fixing holder is fixed to the optical fiber cable 33. It should be appreciated that, by rotating the secondary holder 32 at an appropriate position, the protruded-portions 36b and 37b are brought into the slide preventive grooves of the position establishing grooves 34c and 35c, respectively, to establish the position of the secondary holder 32. As shown in FIG. 22 or 23, in the optical fiber cable fixing holder, by fixing a generally U-shaped fixing metal piece 38 to a fixed-member 40 with the use of screws 39, the optical fiber cable 33 is fixed to the fixed-member 40 through the optical fiber cable fixing holder.

According to this embodiment, because the pressing portions 34b and 35b of the main holder 31 are inwardly deformed, in accordance with the sliding amount of the secondary holder 32, any optical fiber cable 33, of a wide range of diameters, can be met properly. Moreover, if the sliding amount is preliminarily established in accordance with the diameter of the optical fiber cable 33, the optical fiber cable 33 can be fixed with an appropriate amount of pressing force, without incurring undue stress to the optical fibers contained in the optical fiber cable 33.

For changing the fixing position of the optical fiber cable 33, because the pressing portions 34b and 35b are restored to remove the pressing force to the optical fiber cable 33 by reversely sliding the secondary holder 32, the optical fiber cable 33 is simply changed in position to slide the secondary holder 32 again. Therefore, the excessive length treatment of the optical fiber cable 33 or optical fibers can be totally or partly omitted. Furthermore, owing to the provision of the position establishing grooves 34c and 35c in the main holder 31 and the protruded-portions 36b and 37b on the secondary holder 32, the sliding position of the secondary holder 32 can positively be established.

In this embodiment, nothing, in particular, is provided on the inner surfaces of the pressing portions 34b and 35b of the main holder 31. However, if a plurality of protuberances are provided on the inner surfaces of the main holder 31, the optical fiber cable 33 can be firmly fixed without the need of strong holding force of the pressing portions 34b and 35b to the optical fiber cable 33 and without incurring undue stress to the optical fibers contained in the cable. In this third embodiment, in order to unite the third semi-cylindrical member 36 with the fourth semi-cylindrical member 37, a uniting means comprising the pair of lock grooves 36a provided in the third semi-cylindrical member 36 and the pair of lock pawls 37a provided on the fourth semi-cylindrical member 37.

Figure 24A:
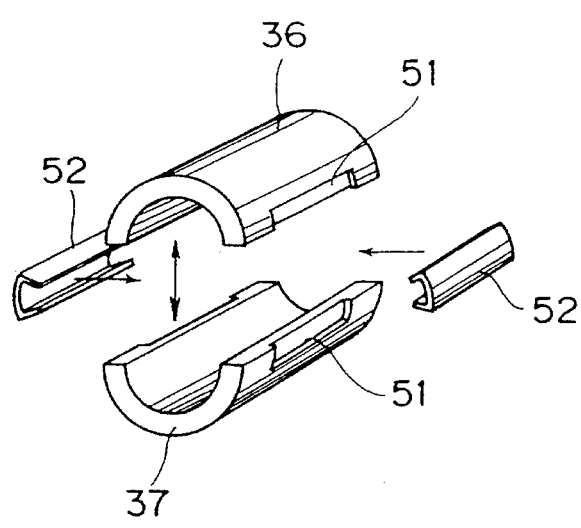
FIG. 24A is an exploded perspective view showing another embodiment of a uniting means.
Figure 24B:
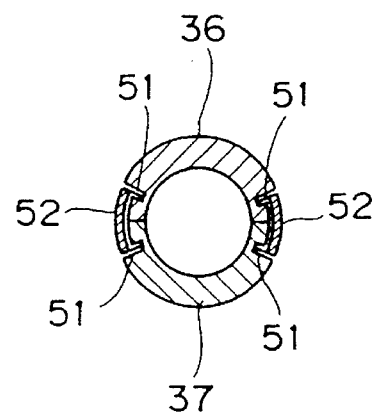
FIG. 24B is a sectional view thereof.
Figure 24C:
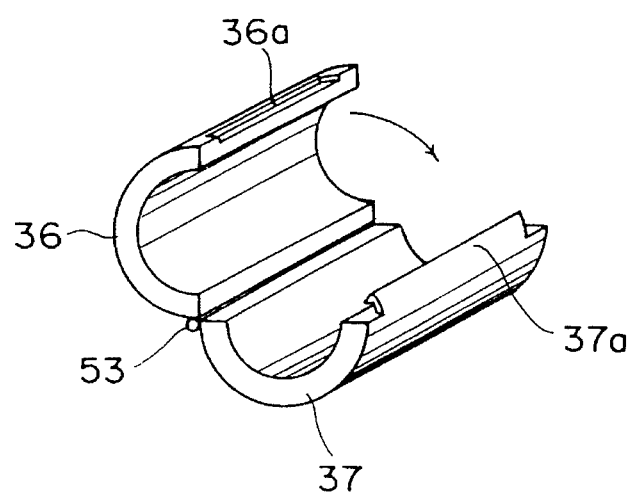
FIG. 24C showing a further embodiment of the uniting means.

However, it should be understood that the uniting means is not limited to this. For example, as is shown in FIGS. 24A and 24B, an arrangement is possible in which both the third and fourth semi-cylindrical members 36 and 37 are provided with grooves 51, respectively, so that they are united together by connecting metal pieces 52. Also, as shown in FIG. 24C, the third semi-cylindrical member 36 and the fourth semi-cylindrical member 37 may be turnably connected together through a hinge, so that they are united together by means of a lock groove 36a and a lock pawl 37a as in the third embodiment. Although not shown, the third and fourth semi-cylindrical members 36 and 37 may be united together by screws, permanently connected together by adhesive, or united together by a quite different member such as a binding belt. Also, the similar uniting means may be employed for uniting the main holder 31. The similar uniting means may also be employed for the female holder 21 and the male holder 22 in the second embodiment.

(4) Fourth Embodiment

Figure 25:
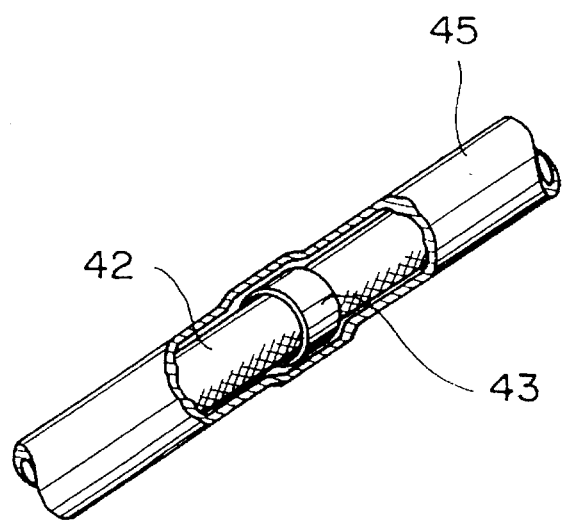
FIG. 25 is a perspective view, partly cut-away, showing an optical fiber cable according to the fourth embodiment of the present invention.
Figure 26:
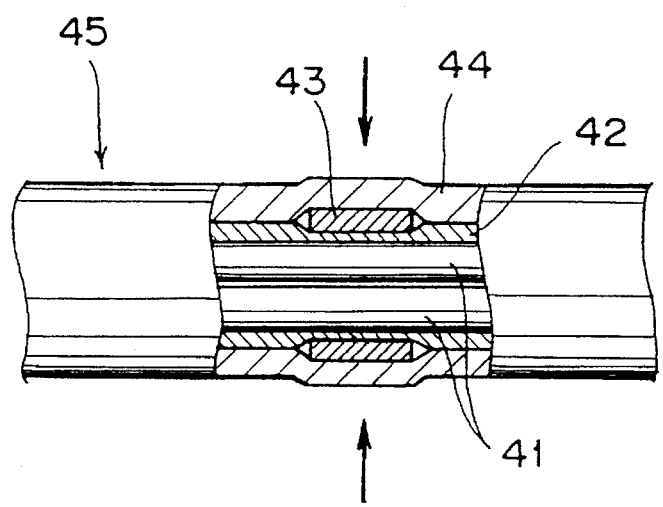
FIG. 26 is a front view, partly in section, of the optical fiber cable of the fourth embodiment.
Figure 27A:
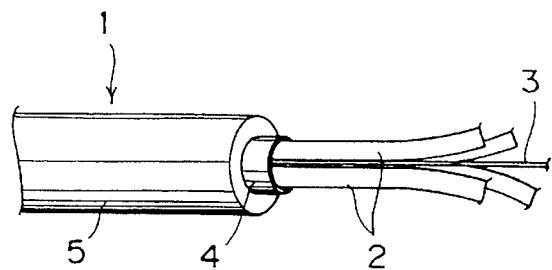
FIGS. 27A to 27D are illustrations showing a conventional structure for fixing an optical fiber cable to a fixed-member such as a housing of a light transmitting device.
Figure 27B:
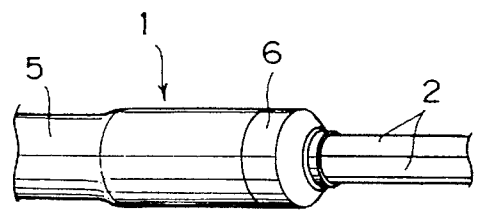
Figure 27C:
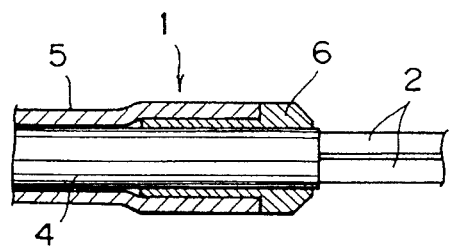
Figure 27D:
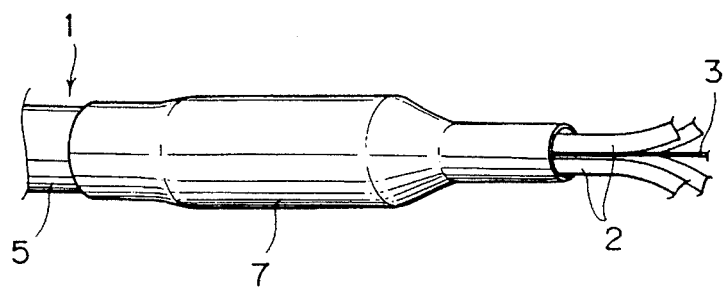
Figure 28:
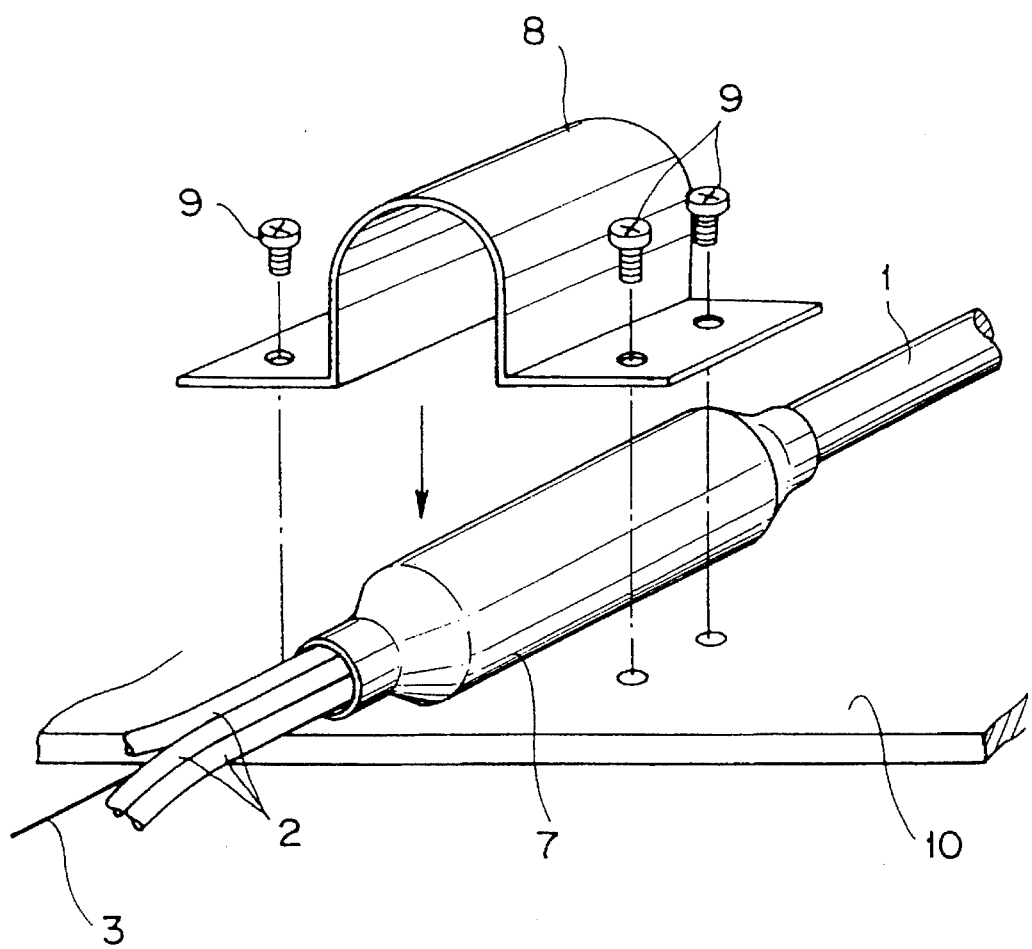
FIG. 28 is an exploded perspective view showing another conventional structure for fixing an optical fiber cable to a fixed-member such as a housing of a light transmitting device.

FIGS. 25 and 26 are explanatory views of a fourth embodiment of the present invention, FIG. 25 is a perspective view, partly cut-away, showing an optical fiber cable, and FIG. 26 is a sectional view thereof. In FIGS. 25 and 26, reference numeral 41 denotes a plurality of optical fibers. The optical fibers 41, as well as a reinforcing wire member (not shown), are coated with a first coating member (press roll) in a simple manner. Reference numeral 43 denotes a circular tube-like ring member. The ring member 43 is made of metal or the like and has a sufficient degree of rigidity. A plurality of such ring members 43 are arranged on the first coating member 42 with a predetermined space. Then, the entire periphery of the first coating member 42 including the surfaces of the ring members 43 is further coated with a second coating member (sheath) 44 made of a vinyl chloride or the like. An optical fiber cable 45 of this embodiment is thus constructed.

The optical fiber 45 may be fixed to the fixed-member by means of fixing the generally U-shaped fixing metal piece with the use of screws as in the third or fourth embodiment. At that time, that portion of the optical fiber cable 45 which is fixed by the U-shaped fixing metal piece includes at least one ring member 43. Owing to this arrangement, the pressing force of the U-shaped fixing metal piece is absorbed by the ring member 43 and the optical fiber cable 45 can be fixed firmly without incurring undue stress to the optical fibers 41 contained in the cable. For changing the fixing position of the optical fiber cable 45, the optical fiber cable 45 may be fixed at a location where an adjacent ring member is located. Therefore, the excessive length treatment of the optical fiber cable or optical fibers can be totally or partly omitted.

Because the present invention is constructed in the manner as described in the foregoing, it can properly meet any optical fiber cable of a wide range of diameters without deteriorating optical transmission characteristics when the optical fiber cable is laid on (fixed to) the fixed-member. Also, the excessive length treatment can be totally or partly omitted.

What is claimed is:

1. An optical fiber cable fixing structure comprising:

a base member;

a first cable holding member fixed to one face of said base member, said first cable holding member having an arcuate first inner peripheral surface extending outwardly from said one face of said base member for contact with a side surface of said optical fiber cable;

a second cable holding member slidably mounted on said one face of said base member for sliding on said one face of said base member toward and away from said first cable holding member, said second cable holding member having an arcuate second inner peripheral surface for engaging with a side surface of said optical fiber cable without engagement with said first cable holding member; and a stopper member for removably fixing said second cable holding member to desired positions on said base member.

2. An optical fiber cable fixing structure of claim 1, wherein said first and second cable holding members area respectively, provided on said first and second inner peripheral surfaces with a plurality of protuberances.

3. An optical fiber cable fixing structure of claim 1, wherein said base member includes a guide groove inclined relative to a longitudinal direction of said optical fiber cable fixed to said base member, and said second cable holding member having, a contacting surface thereof with said base member, a pin member for loosely fitting into said guide groove of said base member.

4. An optical fiber cable fixing structure of claim 3, wherein said pin member of said second cable holding member has at a distal end thereof, an escape preventive portion larger than the width of said guide groove, said base member having a through-hole, continuous to said guide groove, and slightly larger than said escape preventive portion.

5. An optical fiber cable fixing structure of claim 3, wherein said stopper means includes a ratchet member having a plurality of teeth, said teeth being slidable in advancing and retreating directions relative to said guide groove, and means for biasing said ratchet member so that said teeth advance to said guide groove.

6. An optical fiber cable fixing holder comprising:

a female holder including a first semi-cylindrical member having a first tapered portion on an inner peripheral wall thereof, said tapered portion having a first thread, a second semi-cylindrical member having a second tapered portion on an inner peripheral wall thereof, said second tapered portion having a second thread which forms a tapered female-threaded portion which is continuous to said first thread of said first semi-cylindrical member when said second semi-cylindrical member is united with said first semi-cylindrical member, and female holder uniting means for uniting said first semi-cylindrical member with said second semi-cylindrical member; and a male holder including a third semi-cylindrical member having a third tapered portion on an outer peripheral wall thereof, said third tapered portion having a third thread, a fourth semi-cylindrical member having a fourth tapered portion on an outer peripheral wall thereof, said fourth tapered portion having a first thread which forms a tapered male-threaded portion which is continuous to said third thread portion of said third semi-cylindrical member when said fourth semi-cylindrical member is united with said third semi-cylindrical member, and male holder uniting means for uniting said third semi-cylindrical member with said fourth semi-cylindrical member;

said male-threaded portion of said male holder being elastically inwardly deformed in accordance with a screwing amount thereof by screwing said male-threaded portion of said male holder into said female-threaded portion of said female holder.

7. An optical fiber cable fixing holder of claim 6, wherein said male holder includes a protuberance which is formed on that side of the inner peripheral wall opposite to that side of the inner peripheral wall on which said third and fourth threads are formed.

8. An optical fiber cable fixing holder comprising:

a main holder which is to be directly mounted on said optical fiber cable, said main holder including a first semi-cylindrical member, a second semi-cylindrical member, and main holder uniting means for uniting said first semi-cylindrical member with said second semi-cylindrical member; and a secondary holder which is to be mounted on said main holder, said secondary holder including a third semi-cylindrical member, a fourth semi-cylindrical member, and secondary holder uniting means for uniting said third semi-cylindrical member with said fourth semi-cylindrical member;

at least one of said first and second semi-cylindrical members further including a pressing portion, said pressing portion elastically deforming said secondary holder in accordance with a sliding position of said secondary holder when said secondary holder is slidably mounted relative to said main holder.

9. An optical fiber cable fixing holder of claim 8, wherein said pressing portion includes a protuberance formed on an inner surface thereof.

10. An optical fiber cable fixing holder of claim 8, wherein said main holder includes a plurality of position establishing grooves for stepwise establishing a sliding position of said secondary holder, said secondary holder having a locking protruded-portion which is to be inserted into said position establishing grooves.

11. An optical fiber cable comprising:

a plurality of optical fibers;

a first coating member for coating said optical fibers;

a plurality of ring members spacedly arranged on an outer side of said first coating member; and a second coating member for coating said first coating member and said ring members.

* * * * *